(12) United States Patent
Henderson

(10) Patent No.: US 11,976,431 B2
(45) Date of Patent: May 7, 2024

(54) METHODS FOR CONSTRUCTING TENSIONLESS CONCRETE PIER FOUNDATIONS AND FOUNDATIONS CONSTRUCTED THEREBY

(71) Applicant: Terracon Consultants, Inc., Olathe, KS (US)

(72) Inventor: Allan P. Henderson, Bakersfield, CA (US)

(73) Assignee: TERRACON CONSULTANTS, INC., Olathe, KS (US)

( * ) Notice: Subject to any disclaimer, the term of this patent is extended or adjusted under 35 U.S.C. 154(b) by 0 days.

(21) Appl. No.: 17/840,305

(22) Filed: Jun. 14, 2022

(65) Prior Publication Data
US 2022/0380996 A1 Dec. 1, 2022

Related U.S. Application Data

(62) Division of application No. 16/518,186, filed on Jul. 22, 2019, now Pat. No. 11,365,523.
(Continued)

(51) Int. Cl.
*E02D 27/42* (2006.01)
*E02D 5/42* (2006.01)
*F03D 13/20* (2016.01)

(52) U.S. Cl.
CPC ............ *E02D 27/42* (2013.01); *E02D 5/42* (2013.01); *E02D 27/425* (2013.01);
(Continued)

(58) Field of Classification Search
CPC ......... E02D 27/42; E02D 5/42; E02D 27/425; E02D 2250/0023; E02D 2300/0001;
(Continued)

(56) References Cited

U.S. PATENT DOCUMENTS

| 732,485 A | 6/1903 | Wight |
|---|---|---|
| 969,039 A | 8/1910 | Cowles |

(Continued)

FOREIGN PATENT DOCUMENTS

| CA | 2551712 | 6/2012 | |
|---|---|---|---|
| CA | 2810854 A1 * | 9/2013 | ............. E02D 27/00 |

(Continued)

OTHER PUBLICATIONS

Declaration of Dr. John T. Bryant in Support of Petition for Inter Partes U.S. Pat. No. 7,618,217 (filed Sep. 9, 2021).
(Continued)

*Primary Examiner* — Brian D Mattei
*Assistant Examiner* — Omar F Hijaz
(74) *Attorney, Agent, or Firm* — Jacobson Holman PLLC

(57) ABSTRACT

A tensionless concrete pier foundation for supporting a tower and a method of constructing the same is provided, the foundation having an outer CMP and an inner CMP with an annular space therebetween in which a plurality of sleeved tower anchor bolts are embedded, at least the outer CMP having an upper edge that is flush with the top of the foundation after the tower has been installed. A method of plumbing a tower anchor bolt cage using a bolt alignment ring is also provided that includes coupling the upper ends of the CMPs together with lateral spacing bolts that extend across the annular space. The tower anchor bolt cage is suspended from the lateral spacing bolts by the bolt alignment ring, and the lateral spacing bolts are shimmed on a low side as necessary for leveling the alignment ring and plumbing the bolt cage, before concrete pour.

5 Claims, 9 Drawing Sheets

Related U.S. Application Data

(60) Provisional application No. 62/760,433, filed on Nov. 13, 2018.

(52) U.S. Cl.
CPC ............ *E02D 2250/0023* (2013.01); *E02D 2300/0001* (2013.01); *E02D 2300/0006* (2013.01); *E02D 2300/002* (2013.01); *E02D 2300/0029* (2013.01); *F03D 13/22* (2016.05)

(58) Field of Classification Search
CPC ...... E02D 2300/0006; E02D 2300/002; E02D 2300/0029; F03D 13/22; Y02E 10/728
See application file for complete search history.

(56) References Cited

U.S. PATENT DOCUMENTS

| | | | |
|---|---|---|---|
| 1,139,384 A | 5/1915 | Taf | |
| 1,189,459 A | 7/1916 | Lundin | |
| 1,529,895 A | 3/1925 | Chance et al. | |
| 1,647,925 A | 11/1927 | May | |
| 2,377,055 A | 5/1945 | Thornley | |
| 2,625,815 A | 1/1953 | Black | |
| 2,971,295 A | 2/1961 | Reynolds | |
| 3,646,748 A | 3/1972 | Lang | |
| RE27,732 E | 8/1973 | Van Buren | |
| 3,798,868 A | 3/1974 | Loranger | |
| 3,927,497 A | 12/1975 | Yoshinaga et al. | |
| 4,043,133 A | 8/1977 | Yegge | |
| 4,051,661 A | 10/1977 | Leprohon, Jr. et al. | |
| 4,068,445 A | 1/1978 | Bobbitt | |
| 4,092,811 A | 6/1978 | Lin et al. | |
| 4,197,695 A | 4/1980 | Hughes et al. | |
| 4,247,225 A | 1/1981 | Chickini, Jr. et al. | |
| 4,866,903 A | 9/1989 | Ferstay | |
| 4,887,691 A | 12/1989 | Rotondo | |
| 5,218,805 A | 6/1993 | Rex | |
| 5,505,033 A | 4/1996 | Matsuo et al. | |
| 5,586,417 A | 12/1996 | Henderson et al. | |
| 5,623,792 A | 4/1997 | Crumpacker | |
| 5,826,387 A | 10/1998 | Henderson et al. | |
| 5,966,882 A | 10/1999 | Naito | |
| 6,102,118 A | 8/2000 | Moore | |
| 6,659,691 B1 | 12/2003 | Berry | |
| 6,665,990 B1 | 12/2003 | Cody et al. | |
| 6,672,023 B2 | 1/2004 | Henderson | |
| 6,705,058 B1 | 3/2004 | Foust et al. | |
| 6,782,667 B2 | 8/2004 | Henderson | |
| 7,155,875 B2 | 1/2007 | Henderson | |
| 7,533,505 B2 | 5/2009 | Henderson | |
| 7,618,217 B2 | 11/2009 | Henderson | |
| 7,707,797 B2 | 5/2010 | Henderson | |
| 7,905,069 B1 | 3/2011 | Lockwood | |
| 8,720,139 B2 | 5/2014 | Henderson | |
| 9,096,986 B2 | 8/2015 | Henderson | |
| 9,255,476 B2 * | 2/2016 | Mancini | E21D 1/00 |
| 9,340,947 B2 | 5/2016 | Henderson | |
| 9,481,973 B2 | 11/2016 | Henderson | |
| 9,783,950 B2 | 10/2017 | Henderson | |
| 10,640,995 B2 | 5/2020 | Phuly | |
| 2002/0050110 A1 | 5/2002 | Ytterberg | |
| 2002/0095878 A1 | 7/2002 | Henderson | |
| 2002/0124502 A1 | 9/2002 | Henderson | |
| 2004/0261340 A1 | 12/2004 | Behlinger et al. | |
| 2005/0005562 A1 | 1/2005 | Henderson et al. | |
| 2005/0252129 A1 * | 11/2005 | Guillebeau | E02D 27/42 52/380 |
| 2011/0173897 A1 * | 7/2011 | Schneider | E04D 13/08 52/16 |
| 2012/0047830 A1 | 3/2012 | Phuly | |
| 2012/0070233 A1 | 3/2012 | Wang et al. | |
| 2012/0151860 A1 | 6/2012 | Li | |
| 2012/0266447 A1 | 10/2012 | Diaz-Vallellanes | |
| 2012/0314540 A1 | 12/2012 | Alter | |
| 2013/0129474 A1 | 5/2013 | Schacknies et al. | |
| 2013/0199117 A1 * | 8/2013 | Tuominen | F03D 13/22 52/297 |
| 2013/0255169 A1 | 10/2013 | Henderson | |
| 2014/0260223 A1 | 9/2014 | Long et al. | |
| 2015/0376859 A1 * | 12/2015 | Phuly | E04H 12/341 52/294 |
| 2016/0047106 A1 * | 2/2016 | Henderson | E02D 27/02 52/223.13 |
| 2018/0264680 A1 | 9/2018 | Phuly | |
| 2020/0032478 A1 | 1/2020 | Rajewski | |

FOREIGN PATENT DOCUMENTS

| | | |
|---|---|---|
| DE | 2754577 | 6/1979 |
| DE | 10105472 | 8/2002 |
| DE | 202012006606 | 11/2012 |
| EP | 0160135 | 11/1985 |
| EP | 1526278 | 4/2005 |
| FR | 2833029 | 6/2003 |
| JP | 60-92518 | 5/1985 |
| JP | 61-109826 | 5/1986 |
| JP | 64-71987 | 3/1989 |
| JP | 4-353117 | 12/1992 |
| JP | 5-311678 | 11/1993 |
| JP | H5-311678 | 11/1993 |
| JP | 8-338034 | 12/1996 |
| JP | 9-256390 | 9/1997 |
| JP | 11-181797 | 7/1999 |
| JP | 2001-200582 | 7/2001 |
| JP | 2002-061201 | 2/2002 |
| JP | 2003-013442 | 1/2003 |
| JP | 2003-232046 | 8/2003 |
| JP | 2005-220554 | 8/2005 |
| JP | 2010-65454 | 3/2010 |
| KR | 2001/0057453 | 7/2001 |
| WO | WO 84/03531 | 9/1984 |
| WO | WO 02/27105 | 4/2002 |
| WO | WO 02/099204 | 12/2002 |
| WO | WO 2011/029994 | 3/2011 |
| WO | WO 2012/037450 | 3/2012 |
| WO | WO 2012/062425 | 5/2012 |

OTHER PUBLICATIONS

Declaration of Dr. John T. Bryant in Support of Petition for Inter Partes U.S. Pat. No. 7,533,505 (filed Sep. 9, 2021).
Declaration of Dr. John T. Bryant in Support of Petition for Inter Partes U.S. Pat. No. 7,707,797 (filed Sep. 9, 2021).
Newman, Morton. Structural Details for Concrete Construction. McGraw Hill Book Company, 1998.
Peck et al. Foundation Engineering, Second Edition, John Wiley & Sons, 1953.
Federal Highway Administration Transportation. Geotechnical Engineering Circular N. 4, Ground Anchors and Anchored Systems, Jun. 1999.
Petition for Inter Partes Review of U.S. Pat. No. 7,533,505 filed Sep. 10, 2021.
Petition for Inter Partes Review of U.S. Pat. No. 7,618,217 filed Sep. 10, 2021.
Petition for Inter Partes Review of U.S. Pat. No. 7,707,797 filed Sep. 10, 2021.
Post-Tensioning Manueal, Fifth Edition, Post-Tensioning Institute, 1990.
Prestressed Concrete, PCA America's Cement Manufacturers, 1916.
Kelley. A. Short History of Unbounded Post-Tensioning Specifications, Concrete Repair Bullentine, Jul./Aug. 2001.
Design Examples: Attachment 8.
Nigels, McLeod C. Prestressed Conrete Tension Piles and Their Connections, PCI Journal, Jul.-Aug. 1988.
Reflections on the Beginnings of Prestressed Concrete in America, The Prestressed Concrete Institute, 1981.
U.S. Department of Transportation Federal Highway Administration. Post-Tensioning Tendon Installation and Grouting Manual, Version 2.0, May 2013.

(56) References Cited

OTHER PUBLICATIONS

Aschenbroich, Horst. Dipl. Ing. A Post Tensioned Micropile Foundation System with Groutable Void Forms (GVF).
Aschenbroich, Horst, Dipl. Ing. Micro Pile Reinforcement Systems and Corrosion Protection, 2001.
Deformation of Reinforced Concrete Anchor Foundations in the Far Norht, Plenum Publishing Corporation, 1991.
Crabtree et al. The Strengthening of Transmission Tower Foundations Using Grouted Anchor Bars.
Kim, Nak-Kyung. Performance of Tension and Compression Anchors in Weathered Soil. Journal of Geotechnical and Geoenvironmental Engineering, Dec. 2003.
Dams—Innovations for Sustainable Water Resources, $22^{nd}$ Annual USSD Conference San Diego, California, Jun. 24-28, 2002.
Prestressed Concrete Bridges.
Wind Turbine Anchoring Solutions, Peikko Group, Concrete Connections.
Standard Specification for Steel Strand, Uncoated Seven-Wire for Prestressed Concrete, ASTM International.
Allam et al. Crack width evaluation for flexural RC members. Alexandria Engineering Journal, (2012) 51, 211-220.
Svensson, Henrick. Design of Foundations for Wind Turbines, 2010.
Eurooppalainetekninen hyväksyntä. ETA-10/02; European Technical Approval. VTT Expert Services Oy. Issued Apr. 21, 2011.
Bruce et al. Foundation Rehabilitation of the Pocomoke River Bridge, Maryland, Using High Capacity Preloaded Pinpiles, The Conference on Bridges official proceedings. Jun. 4-6, 1984.
Peikko's Foundation Solution Chosen for Wing for Wing Park to be Built in Hamina, Finland. https://web.archive.org/web/20111228043258/http://www.peikko.com/news/n=Peikko%27s+Foundation+Solutio n+choses+for+Wind+Park+to+be+builtin+in+Hamina%2c+Finland.
Hevosselkä Wind Park, Tervola, Finland. https://www.peikko.com/reference/hevosselka-wind-park.
Loflin, Bryan J. Bond and Material Properties of Grade 270 and Grade 300 Prestressing Strands. Jun. 10, 2008.
Peikko to supply the wind turbine tower foundation solution to Finnish Muukko wing park. https://web.archive/org/web/20121001214327/http://www.peikko.com/news/n=Peikko+to+supp ly+the+wing+turbine+tower+foundation+solution+to+Finnish+Mu ukko+wing+park.
Muukko Wind Park, Lappeenranta, Finland. https:/www.peikko.com/reference/muukko-wind-park/.
Mäkelänkangas Wind Park, Hamina, Finland. https://www.peikko.com/reference/makelankangas-wind-park/.
https://web.archive.org/web/20121003065612/http://www.peikko.com:80/news/year=2012.
Peikko and Enercon to Expand Their Cooperation. Press Release Apr. 5, 2011. https://web.archive/org/web/20110814012119/http://www.peikko.com/news/n=Peikko+and+Enecon+to+expand+their+cooperation.
Peikko to supply the wind turbine tower foundation solution to Finnish Muukko wind park. https://www.peikko.cz/novinky/peikko-to-supply-the-wind-turbine-tower-foundation-solution-to-finnish-muukko-wind-park-2/.
Peikko Group: Product Catalogue. Jul. 2, 2012.
Aschenbroich, Horst Dipl.Ing. Reinforcement of dams in Canada and the USA. Www.contechsystems.com.
https://web.arcive.org/web/20121003064830/http://www.peikko.com/news/year=2012/month=05.
Wind Turbines Uljabuouda, Sweden, Project Story in PeikkoNews Feb. 2009. https://web.archive.org/web/20120320121335/http:www.peikko.com/reference-main/references/rg=Power+Plants+and+LInes/r=Wind+Turbines+Ulkabuouda+%2C+Sweden.
A unique turnkey solution for wind turbine tower foundations. https://web.archive.org/...b/20120403071116/http://www.peikko.com/solutions-category/solutions/s=A+unique+turnkey+solution+for+w ind+turbine+tower+foundations/sid=24072976.
Clemence, Samuel P., Uplift Behavior of Anchor Foundations in Soil. Proceedings of a session sponsored by the Geotechnical Engineering Division of the American Society of Civil Engineers in conjunction with the ASCE Convention in Detroit, Michigan. Oct. 24, 1985.
Benefits for wind energy specialist. https://web.archive/org/web/20121030175316/http://www.peikko.com/group/t=Wind+Energy+Specialist.
Affidavit of Josef Alter in U.S. Appl. No. 11/428,778, executed on Jun. 2, 2009.
Video by Peiiko Group uploaded to YouTube on Apr. 13, 2012. https://urldefense.com/v3/_https://youtu.be/j7k-ayGWfh4_;lUrcuqBw_ lQl3puXZHUFb4eyZpuDPdTKr3XTjcljoqtpuEEdpwCGStoa9L6X9-0D1V2Ngk3NmsUcbQ5l$.

\* cited by examiner

METHODS FOR CONSTRUCTING TENSIONLESS CONCRETE PIER FOUNDATIONS AND FOUNDATIONS CONSTRUCTED THEREBY

BACKGROUND OF THE INVENTION

Field of the Invention

The present invention relates to one or more methods of constructing tensionless concrete pier foundations used to support tall, heavy and/or large towers and the like, and to tensionless concrete pier foundations constructed by such methods.

Description of the Related Art

Concrete foundation structures of various kinds have been developed to support commercial signs, traffic signs, light poles and the like. To support larger structures including tall and heavy towers and wind turbines that exert significant overturning force on the foundation, Applicant developed and commercialized a tensionless pier foundation which is described in U.S. Pat. No. 5,586,417 ("the '417 patent"). The '417 patent is hereby expressly incorporated by reference as if fully set forth in its entirety herein.

The tensionless pier foundation described in the '417 patent includes a concrete foundation formed as a cylinder having an outer boundary shell defined by a corrugated metal pipe (CMP) and an inner boundary formed by a second CMP of smaller diameter, with the upper ends of both CMPs being below the top of the foundation. Elongated high strength steel bolts run from an anchor flange near the bottom of the concrete cylinder vertically up through the concrete to extend above the upper end of the foundation and through a connecting flange for the supported structure to be connected on top of the foundation. The bolts are encased in sleeves or hollow tubes over a substantial portion of their vertical extent in the concrete to allow the encased portion of the bolts to be stretched and thus tensioned. With such tensioning of the bolts, the concrete is kept under constant compression while the bolts are always in static tension. Thus, the pier foundation in the '417 patent is referred to as "tensionless" due to the absence of tensile stress on the concrete.

The '417 patent construction was a significant improvement over previously known concrete foundations that incorporated a reinforcing steel bar matrix and were subject to repeatedly alternating tensile and compressive loads on the steel bar matrix, leading to fatigue and, in many cases, premature failure. Additional improvements in tensionless concrete foundations are shown in Applicant's other U.S. Pat. No. 8,720,139 ("the '139 patent") and U.S. Pat. No. 9,340,947 ("the '947 patent"), among others. The complete disclosures of the '139 and '947 patents are hereby expressly incorporated by reference as if fully set forth in their entirety herein.

While the tower-supporting tensionless concrete pier foundation disclosed in the '417 patent is strong and long lasting in use, the method of constructing the pier foundation required the construction of a form plate and also often involved sequential steps for the concrete pour and subsequent grouting associated with leveling of the tower support surface and placement of the tower on the foundation. Having to perform these steps sequentially increased the time required for construction and in some cases incurred significant costs particularly as related to the amount of time that heavy equipment such as cranes had to remain on site waiting for concrete and/or grout cure before the tower could be set and/or before the tower anchor bolts could be fully tensioned.

Therefore, it would be beneficial to have a method of constructing a tensionless pier foundation that reduces the overall cost of the foundation through various improvements, including elimination of the need for a separate form plate as well as the tower placement delays associated with waiting for grout cure, among others, while still obtaining and even improving the strength, operational effectiveness and structural integrity of the foundation over the life thereof.

SUMMARY OF THE INVENTION

In view of the foregoing, the present invention is directed to a method of constructing a tensionless concrete pier foundation having a plurality of elongated tower anchor bolts embedded within sleeves in a concrete pier and secured at their lower ends to an anchor or embedment ring. The upper ends of the anchor bolts extend above the top of the concrete so that the bolts, which bear the tensile load, can be post-tensioned to keep the concrete pier under constant compression in like manner to the tensionless concrete pier foundation construction described in the '417 patent. And like the pier foundation in the '417 patent, the concrete pier foundation according to the present invention is also referred to as a "tensionless" pier foundation due to the absence of tensile stress on the concrete.

The tower anchor bolts and embedment ring are received within an annular space formed between an outer corrugated metal pipe (CMP) and an inner CMP having a smaller diameter than the outer CMP. The upper end of at least the outer CMP extends vertically to be flush with the top of the foundation and, according to a preferred embodiment, the upper ends of both the inner and outer CMPs are flush with the top of the foundation. By having the upper ends of the CMPs flush with the top of the foundation, the upper surface of the concrete that is poured into the annular space between the CMPs forms the support surface for the lower base flange of the tower. This annular space can be filled with concrete and pre-grouted in virtually a single step, producing a level surface and allowing both the concrete and the grout to cure simultaneously instead of having a multi-step sequence of concrete pour, waiting for concrete cure, leveling of the support surface with additional grout and then waiting for grout cure before the tower can be fully assembled. As a result, the amount of time that a crane used to mount the tower has to spend on site can be reduced to a single day, saving in construction costs. In addition, once the tower is installed, the area around the lower base flange of the tower can then be post-grouted up to the top of the foundation to prevent the pooling of water and the like in the annular space. The post-grouting provides a filler and sealer of the space between the CMPs and the tower base flange above the pre-grouting and can be done at anytime, allowing the contractor flexibility in both material utilized and time of placement.

The present invention is also directed to a method of constructing a tensionless concrete pier foundation in which the positioning and spacing of the inner and outer CMPs within an excavation is reinforced with a plurality of lateral steel reinforcement and spacing members that extend through the two CMPs, spanning the annular space between the CMPs. The lateral steel reinforcement and spacing members may be embodied as bolts that are nutted both outside the outer CMP and inside the inner CMP. These lateral steel members can include an upper set of lateral reinforcement and spacing members used to facilitate leveling of the tower anchor bolt cage during construction. In the completed foundation, the lateral steel members provide bursting steel resistance and also allow for CMP location eccentricity adjustment. The lateral steel members can further be used for lifting lug bolt connections, while ends of the bolt members that extend beyond the inner and outer CMPs can be used for future retrofit and repowering additions, while also providing for electrical grounding connection to the CMPs.

Preferably, the lateral steel members include the upper set of spacing members near the top of the CMPs and a lower set of spacing members near the bottom of the CMPs. Additional sets of lateral spacing members may be placed in spaced relationship between the upper and lower sets to provide lateral shear strength and to increase stiffness and buckling resistance, if desired. During construction of the foundation, the upper lateral steel reinforcement and spacing members are used to support a bolt alignment ring which is placed within the annular space between the inner and outer CMPs and on top of the upper lateral steel members. Upper ends of the tower anchor bolts are secured within holes in the bolt alignment ring to suspend the tower anchor bolts and create the spacing for coupling the bolt lower ends to the embedment ring to complete a "tower anchor bolt cage". Once the tower anchor bolts are secured at their upper ends to the bolt alignment ring, the bolts are lifted out of the annular space by the bolt alignment ring and the embedment ring is secured to the lower ends of the tower anchor bolts. The upper lateral spacing members are then removed to allow the tower anchor bolt cage to be lowered into the excavation. The upper lateral spacing members are then re-bolted to the CMPs, with the bolt alignment ring being supported on the spacing members, and the bolt alignment ring is leveled, using shims if necessary, to plumb the bolt cage. Following concrete pour in the annular space, the bolt alignment ring is removed from the upper ends of the tower anchor bolts and can be reused in constructing another foundation.

Also included within the present invention is the placement of a safety protection element such as a guard or padded member over the upper edges of the CMPs to reduce the safety risk to workers who, due to the height of the CMPs in extending to the top of the foundation, may be in direct proximity to the exposed edges. The guard or padded member may be a flexible tubing material, such as a split garden hose, that is fitted over the exposed upper edge(s).

A further feature of the present invention is replacement of the traditional concrete floor formed in the center of the foundation, i.e., the region surrounded by the inner CMP, with steel mesh, rubber mat, diamond plate, plastic sheet and the like to expedite construction and reduce material cost and labor. By replacing traditional concrete with one of these alternate materials, additional cost savings can be realized.

The floor is preferably placed atop a soil backfill. The upper portion of the soil backfill, on the order of about the upper 5 feet of the backfill, is preferably wetted and compacted to improve thermal conductivity and electrical conduction heat dissipation. Finally, approximately the top one foot of concrete poured into the annular space between the CMPs, which spreads the tower base load across the pier, is poured with greater compressive strength concrete (approximately 150% greater strength) than the recommended foundation concrete. By adding this additional compressive strength in the upper twelve inch layer of concrete and spreading the compressive load, the remainder of the pier concrete is subjected to a lesser compressive load making it possible to reduce the cement content below the top foot by at least one sack per cubic yard of concrete, yielding further cost savings in construction.

Further, the bolt alignment ring according to the present invention, in conjunction with the upper lateral spacing members, facilitates leveling of the tower anchor bolt cage to expedite construction and reduce construction expense by eliminating costly delays associated with the traditional steps of concrete pour using a lower chamfered template ring that contacts the concrete, waiting for cure and then subsequent leveling of the tower base flange support surface by adding shims and more cementitious material under the tower base flange and waiting for cure thereof. According to a preferred embodiment of the present invention, the bolt alignment ring does not need to contact the concrete but is supported on the upper lateral members which are at or above the upper surface of the high strength concrete pour and inside the annular space between the CMPs. As supported on the lateral members, the bolt alignment can be confirmed to be level and the tower anchor bolt cage plumb or, if necessary, made level by shimming the lateral members on the low side to raise that part of the bolt alignment ring to level. Following concrete pour, the upper surface of the concrete will then be level and the tower anchor bolt cage plumb all in one step.

Accordingly, it is an object of the present invention to provide a tensionless concrete pier foundation, including a concrete pier for supporting a tower and a method of constructing the same, that saves both time and money as compared with traditional tensionless concrete pier foundation constructions and methods.

Another object of the present invention is to provide a method of constructing a tensionless concrete pier foundation in accordance with the preceding object in which the outer and inner CMPs extend upwardly so that the upper edges thereof are flush with the top of the foundation, the "top of the foundation" being defined as the upper surface of the concrete in the annular space between the CMPs when fully grouted to be level with the upper edges of the inner and outer CMPs after the tower has been installed on the concrete pier.

Yet another object of the present invention is to provide a method of constructing a tensionless concrete pier foundation in accordance with the preceding object in which the upper portion of the outer CMP near the top edge thereof serves as a form plate defining the outer perimeter of the above-ground portion of the concrete foundation.

Still another object of the present invention is to provide a method of constructing a tensionless concrete pier foundation in accordance with the preceding objects in which the upper edges of the inner and outer CMPs create a grout trough in the annular space between the CMPs that can be pre-grouted in virtually a single step with the concrete pour of the annular space to form a level support surface for the tower base flange, allowing both the concrete and the grout to cure simultaneously instead of having a multi-step sequence of concrete pour, waiting for concrete cure, leveling of the support surface with additional grout and then waiting for grout cure before the tower anchor bolts can be fully tensioned, the pre-grouting in the annular space resulting in significant cost savings over earlier methods that often required heavy equipment to remain on site while waiting for concrete cure in order to install the tower.

A further object of the present invention is to provide a method of constructing a tensionless concrete pier foundation in accordance with at least one of the preceding objects in which the inner and outer CMPs are coupled by a plurality of lateral steel reinforcement and spacing members that span the annular space and are nutted both outside the outer CMP and inside the inner CMP to ensure desired positioning and spacing of the CMPs within an excavation, the lateral steel reinforcement and spacing members facilitating plumb placement of the tower anchor bolt cage during construction while also thereafter providing bursting steel resistance as well as CMP location eccentricity adjustment, lifting lug bolt connections, bolt extensions beyond the inner and outer CMPs for future retrofit and repowering additions, and electrical grounding connection to the CMPs.

Yet a further object of the present invention is to provide a method of constructing a tensionless concrete pier foundation in accordance with at least the preceding object in which a reusable bolt alignment ring is used to create the spacing for the tower anchor bolts and to facilitate plumbing of the tower anchor bolt cage during construction, the bolt alignment ring preferably being supported on an upper set of lateral steel reinforcement and spacing members within the annular space between the inner and outer CMPs, and upper ends of the tower anchor bolts being secured within holes in the bolt alignment ring, after which an embedment ring is secured to the lower ends of the tower anchor bolts to complete the tower anchor bolt cage, the upper lateral members being removed to allow the cage to be lowered into the excavation and then re-bolted to the CMPs with the bolt alignment ring supported and leveled on the upper lateral members for plumbing the bolt cage as suspended on the bolt alignment ring and, following concrete pour, the bolt alignment ring being removed and available for reuse in construction of another foundation.

A still further object of the present invention is to provide a method of constructing a tensionless concrete pier foundation in accordance with at least one of the preceding objects in which the method includes placing a safety protection element such as a guard or padded member over the upper edges of the CMPs to reduce the safety risk to workers who, due to the height of the CMPs in extending to the top of the foundation, may be in direct proximity to the exposed edges.

Another object of the present invention is to provide a method of constructing a tensionless concrete pier foundation in accordance with at least one of the preceding objects in which the traditional concrete floor formed in the center of the foundation, i.e., in the region surrounded by the inner CMP and atop a soil backfill, is replaced with steel mesh, rubber mat, diamond plate, plastic sheet and the like to expedite construction and reduce material cost and labor.

Yet another object of the present invention is to provide a method of constructing a tensionless concrete pier foundation in accordance with at least one of the preceding objects in which an upper portion of the soil backfill in the center of the foundation, on the order of about the upper 5 feet of the backfill, is wetted to the approximate optimum moisture content (plus or minus 2%) for the soil and compacted to improve thermal conductivity and electrical conduction heat dissipation. As is known in the geotechnical engineering field, "optimum moisture content" is a term of art that refers to the moisture content of any soil at its maximum density.

Another object of the present invention is to provide a method of constructing a tensionless concrete pier foundation in accordance with at least one of the preceding objects in which about a bottom third of the excavated central region of the foundation is filled with concrete to enhance the lateral shear resistance of the foundation and to allow for the height of the inner CMP to be reduced by about one-third.

Still another object of the present invention is to provide a method of constructing a tensionless concrete pier foundation in accordance with at least one of the preceding objects in which about the top layer (1 ft.) of concrete in the annular space between the CMPs, which spreads the tower base load across the pier, is poured with greater compressive strength concrete (approximately 150% greater) than the recommended foundation concrete, the additional compressive strength in the top foot of concrete reducing the compressive load to which the remainder of the pier concrete is subjected and thereby making it possible to reduce the cement content below the top foot by at least one sack per cubic yard of concrete.

Yet another object of the present invention is to provide a method of constructing a tensionless concrete pier foundation in which a floor thereof is poured with concrete and only the outer CMP extends upwardly so that the upper edge thereof is flush with the upper surface of the concrete forming the concrete floor, a reusable bolt alignment ring having chamfered sides being used to create the spacing for the anchor bolts and to hold the upper ends of the bolts while concrete is poured up to the top of the bolt alignment ring to form the floor, the bolt alignment ring thereafter being removed with the chamfered sides having created a grout trough that can be pre-grouted to reduce on-site time for the heavy equipment used to mount the tower on the foundation.

Still another object of the present invention is to provide a tensionless concrete pier foundation including an outer CMP and an inner CMP that define an annular space between them, the annular space being filled with concrete to create a support surface for the base flange of a tower to be mounted on the concrete pier foundation, at least the outer CMP having an upper edge that is flush with the upper surface of the foundation, the upper surface of the foundation being defined by the upper surface of the concrete, either in the annular space between the CMPs when the upper edges of both CMPs are flush with the top of the foundation, or across the upper surface of a concrete floor poured inside the perimeter of the outer CMP when only the outer CMP upper edge is flush with the top of the foundation, once the tower has been installed and both pre-grouting and post-grouting have been completed.

A further object of the present invention is to provide a tensionless concrete pier foundation in accordance with the preceding object in which the upper edges of both the outer CMP and the inner CMP extend to the top of the foundation, the upper surface of the concrete in the annular space between the CMPs being level with the CMP upper edges once the annular space has been fully grouted after the tower has been installed on the concrete pier.

A still further object of the present invention is to provide a tensionless concrete pier foundation in accordance with the object before the preceding object in which only the outer CMP has an upper edge that extends to the upper surface of the foundation, the upper edge of the inner CMP being about one foot lower than the outer CMP upper edge, the upper surface of the foundation being defined by the upper surface of the concrete poured to form a floor defined by the perimeter of the outer CMP and after both pre-grouting and post-grouting have been completed.

Another object of the present invention is to provide a tensionless concrete pier foundation including an outer CMP and an inner CMP that define an annular space between them, the annular space being filled with concrete and supporting the base flange of a tower to be mounted on the concrete pier foundation, the upper edges of both the outer CMP and the inner CMP extending to the top of the foundation, the top of the foundation being defined as the upper surface of the concrete in the annular space between the CMPs once the annular space has been fully grouted to be level with the upper edges of the CMPs after the tower has been installed on the concrete pier, the annular space being spanned by a plurality of radially extending lateral reinforcement and spacing members that are bolted to the outer and inner CMPs to provide bursting steel resistance as well as CMP location eccentricity adjustment, lifting lug bolt connections, bolt extensions beyond the inner and outer CMPs for future retrofit and repowering additions, and electrical grounding connection to the CMPs.

Yet another object of the present invention is to provide a tensionless concrete pier foundation in accordance with the preceding object in which an upper set of lateral steel reinforcement and spacing members is used to support a bolt alignment ring which is placed within the annular space between the inner and outer CMPs and on top of the upper lateral members during construction, upper ends of the tower anchor bolts being secured within holes in the bolt alignment ring to create the spacing for the anchor bolts to be secured at their lower ends to an embedment ring to form the tower anchor bolt cage which is lowered into an excavation and secured with concrete, the bolt alignment ring thereafter being removed and available for reuse on another foundation.

A further object of the present invention is to provide a tensionless concrete pier foundation in accordance with the preceding two objects in which the floor of the foundation is formed with steel mesh, rubber mat, diamond plate, plastic sheet and the like to expedite construction and reduce material cost and labor.

A still further object of the present invention is to provide a tensionless concrete pier foundation in accordance with at least one of the preceding three objects in which the upper edges of the CMPs are covered with a safety protection element such as a guard or padded member to reduce the safety risk to workers who, due to the height of the CMPs in extending to the top of the foundation, may be in direct proximity to the exposed edges.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
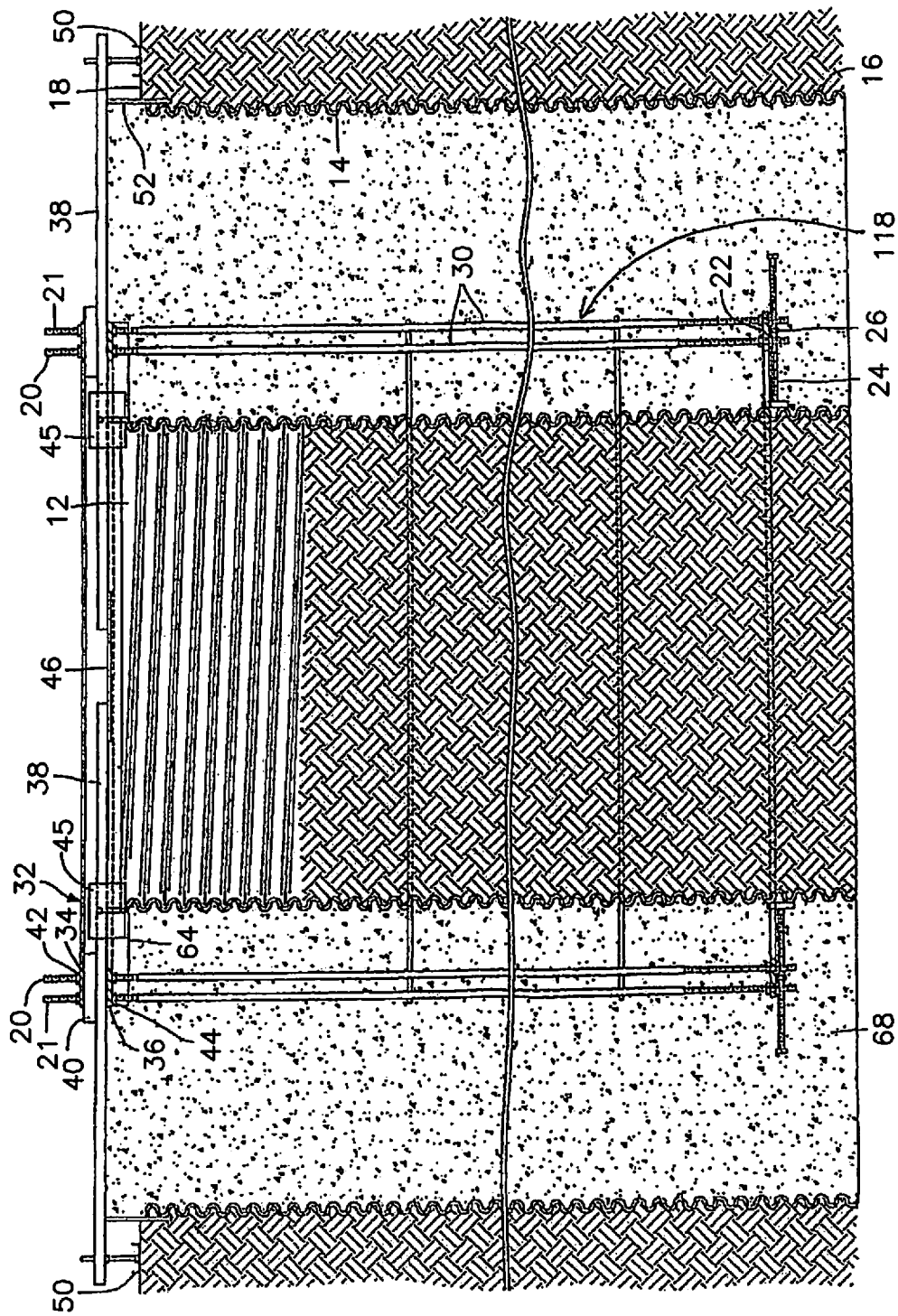
FIG. 1 shows a tensionless concrete pier foundation like that disclosed in the '417 patent.

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1A:
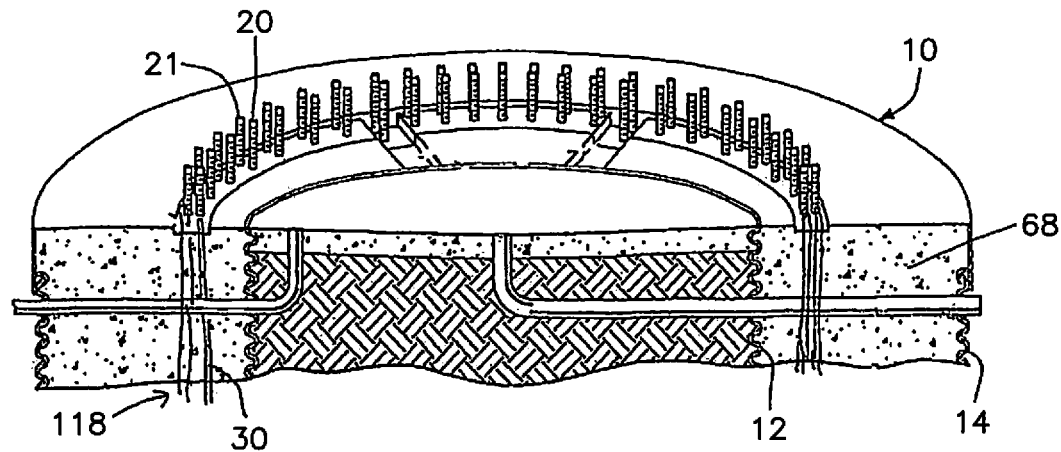
FIG. 1A is a cross-sectional view of the upper end of a pier foundation like that shown in FIG. 1 but in which the soil backfill has been completed to substantially ground level.

A tensionless concrete pier foundation like that disclosed in the '417 patent, in which the soil backfill in the center of the foundation is complete below the surface of the ground 18, is shown in FIG. 1. FIG. 1A is a partial view of a similar concrete pier foundation in which the soil backfill is completed to substantially ground level. In both cases, the concrete pier foundation, generally designated by reference numeral 10, includes an inner corrugated metal pipe (CMP) 12, an outer CMP 14 and a plurality of tower anchor bolts 20, 21 fitted within sleeves 30 and secured at their lower ends to an anchor or embedment ring 22 to form a tower anchor bolt cage generally designated by reference numeral 118. The tower anchor bolt cage 118 is arranged in the annular space formed between the inner and outer CMPs 12, 14, as shown in FIG. 1, with the embedment ring 22 at the bottom of the excavation 16. The embedment ring 22 is radially spaced relative to the inner CMP 12 preferably by utilization of circumferentially spaced horizontal and radially extending positioning bolts 24 threaded through nuts 26 secured relative to the underside of the anchor or embedment ring 22 at points spaced circumferentially thereabout. The outer diameter of the tower anchor bolt cage 118 is generally on the order of about 14 feet.

The upper ends of the bolts 20, 21 are supported from a template referred to generally by the reference numeral 32. The template 32 includes upper and lower ring sections 34 and 36 secured together and operative with associated blockout bodies 64 as further described in the '417 patent. Upwardly opening radial channel members 38 and mounting blocks 40 received in the channel members 38 are clamped between the ring sections 34, 36 by upper and lower nuts 42 and 44 threaded on the bolts 20, 21. The inner ends of the radial channel members 38 are joined by a center plate 46, and the inner portions of the channel members 38 include lateral stabilizers 45 that engage with upper edge portions of the inner CMP 12. The outer ends of the channel members 38 include threadingly adjustable channel member feet 50 abuttingly engageable with the ground 18 for leveling of the ring 32, and a cylindrical form plate 52 is clamped about the upper end of the outer CMP 14. As shown in FIG. 1, the upper surface of the concrete 68 making up the foundation 10 is defined by the upper edge of the form plate 52 which extends above the upper edge of the outer CMP 14.

After the concrete 68 is poured between the CMPs, the upper ends of the tower anchor bolts 20, 21 extend upwardly to project above the top of the concrete for post-tensioning thereof. As shown in FIG. 1, the lowermost ends of the bolts adjacent and above the anchor or embedment ring 22 are not covered by the sleeves 30 to facilitate frictional engagement with the concrete. The sleeves may be hollow tubes or a sleeved effect may be obtained by wrapping the bolts in plastic tape, coating the bolts with a suitable lubrication, or the like. Reference is made to the '417 and '947 patents for a more detailed disclosure of the structure and construction of the basic pier foundation 10 shown in FIGS. 1 and 1A.

Figure 2:
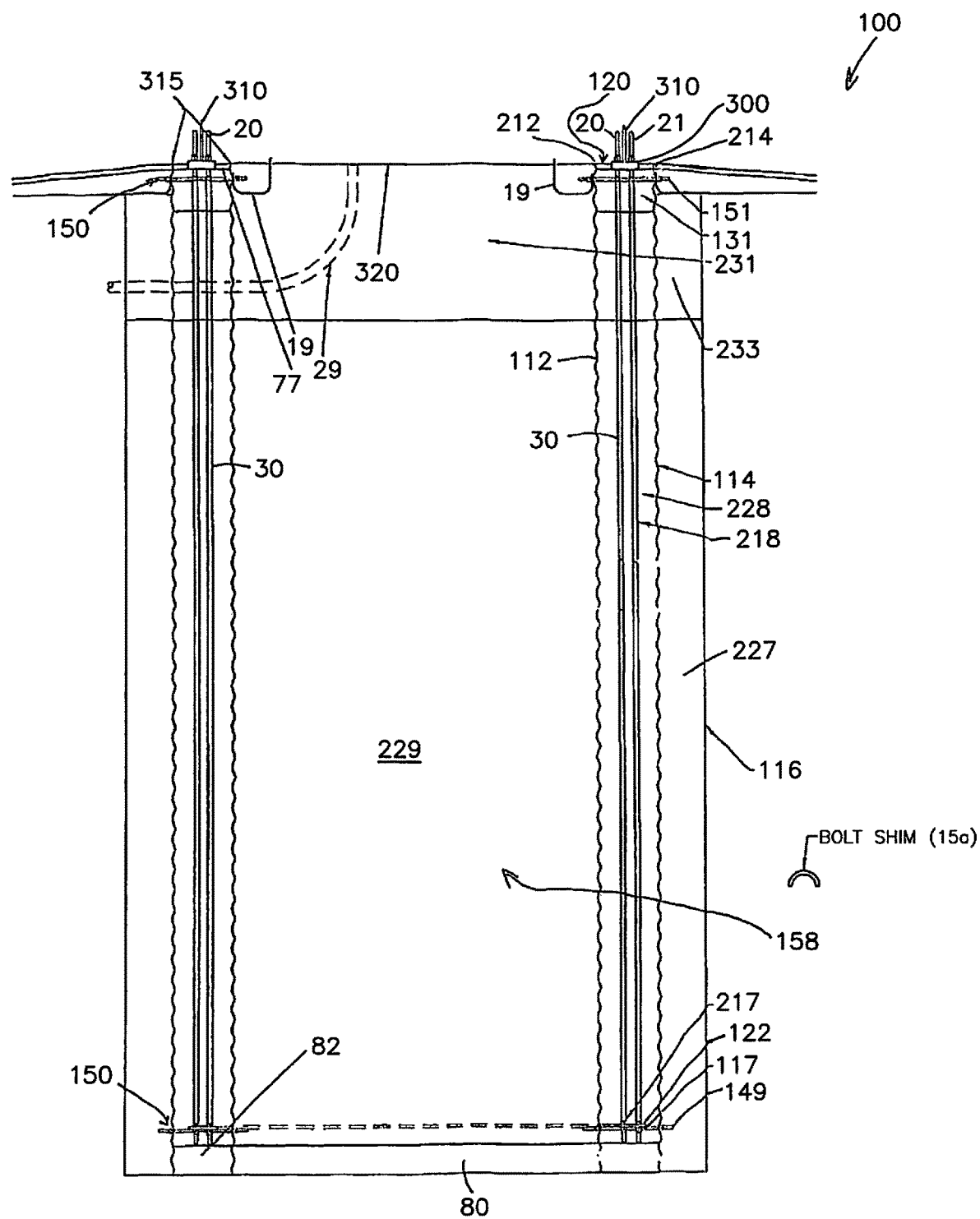
FIG. 2 is a cross-sectional view of a tensionless concrete pier foundation in accordance with a first embodiment of the present invention.

According to a first embodiment shown in FIG. 2, the present invention is directed to a tensionless concrete pier foundation generally designated by reference numeral 100. Like the pier foundation 10 shown in the '417 patent, the tensionless concrete pier foundation 100 includes a plurality of elongated tower anchor bolts 20, 21 embedded within sleeves 30. While not shown in FIG. 2, the lowermost ends of the bolts 20, 21 are not contained within the sleeves 30 but are exposed, as shown in FIG. 1, in order to facilitate frictional engagement with the concrete. As used herein, "concrete" is intended to refer to any combination of aggregate, including various aggregate sizes, water and a binding cementitious material such as Portland cement and the like, which may or may not include optional strength and/or consistency additives, and which hardens upon cure as is known in the concrete and masonry fields.

The bolts 20, 21 are secured at their lower ends to an anchor or embedment ring 122 to form a tower anchor bolt cage generally designated by reference numeral 218. During the construction sequence, a bolt alignment ring 152 is part of the tower anchor bolt cage (see FIGS. 3 and 3A) as will be further described hereinafter. After concrete pour, the bolt alignment ring is removed and the upper ends of the anchor bolts extend above the top of the concrete so that the bolts, which bear the tensile load, can be post-tensioned to keep the concrete pier under compression in like manner to the construction described in the '417 patent.

The tower anchor bolt cage 218 is embedded within an annular space, generally designated by reference numeral 228, formed between the inner corrugated metal pipe (CMP) 112 and the outer CMP 114. Unlike in the '417 patent, the upper edge 214 of at least the outer CMP 114 extends vertically to be flush with the top of the foundation, which is generally designated by reference numeral 120. According to a preferred embodiment shown in FIG. 2, the respective upper edges 214 and 212 of both the outer and inner CMPs 114, 112 are flush with the top of the foundation 120. The "top of the foundation" is defined as the upper surface of the concrete in the annular space 228 between the CMPs when fully grouted to be level with the upper edges of the inner and outer CMPs after the tower has been installed on the concrete pier. Thus, the height of the upper edges 212, 214 of the CMPs 112, 114 establishes the top surface of the foundation 120.

By having the upper edges of the CMPs 112, 114 flush with the top surface of the foundation 120, the annular space 228 created between the CMPs can be effectively pre-grouted with high strength grout to form a level support surface for the lower base flange 300 of the tower 310. As used herein, "grout" is intended to refer to any mixture of fine aggregate, such as sand, mixed with a cementitious material and water, the mixture hardening over time in like manner as with concrete.

The high strength grout spreads load concentration and reduces compression stress on the underlying concrete and, because the grout can be placed and allowed to set ahead of time, i.e., before the tower sections are brought in, the pre-set grout allows the tower anchor bolts to be fully tensioned immediately after setting the tower base sections. This is in contrast to having to wait 24 hours for the grout to set before tensioning the tower anchor bolts and setting additional sections of the tower as can occur when using prior known techniques in which the tower support surface must be first leveled and then grouted. As a result, the amount of time that a crane used to mount the tower has to spend on site can be reduced to a single day.

Once the tower is installed, the lower base flange 300 of the tower and the top of the foundation 120 can then be post-grouted at 77 (see FIG. 4), filling the annular space 228 to the upper edges 212, 214 of the CMPs 112, 114 to prevent the pooling of water and the like. The post-grouting provides a filler and sealer of the space between the CMPs and the tower base flange 300 above the pre-grouting and can be done at anytime, allowing the contractor flexibility in both material utilized and time of placement.

According to a preferred embodiment, the present invention further includes reinforcing the positioning and spacing of the inner and outer CMPs within the excavation using a plurality of lateral steel reinforcement and spacing members generally designated by reference numeral 150. The lateral steel reinforcement and spacing members 150 are positioned horizontally and extend radially through the two CMPs, spanning the annular space 228 between the CMPs. The members 150 are typically embodied as bolts which are nutted both outside the outer CMP 114 and inside the inner CMP 112 as shown in FIGS. 3A and 4.

As shown in FIG. 2, the lateral steel reinforcement and spacing members 150 preferably include an upper set of spacing members 151 near the top of the CMPs for both structural strength and to assist in plumbing the tower anchor bolt cage during construction, and a lower set of spacing members 149 near the bottom of the CMPs. Additional sets of lateral steel reinforcement and spacing elements could also be included in a vertically spaced relationship as deemed necessary or desired to provide shear resistance, stiffness, and support at various heights between the top and bottom of the CMPs. The lateral steel reinforcement and spacing members 150 provide a number of structural benefits including bursting steel resistance, a means for adjusting CMP location eccentricity, and lifting lug bolt connections. Lifting lug bolt connections may be used for attachment of lifting cable hooks, eyes, or other coupling structures used to take hold of the members 150 in order to move or adjust the positioning of the CMPs. Extending portions of the lateral reinforcement and spacing members or bolts 150 that project beyond the inner and outer CMPs also allow for future retrofit and repowering additions, and provide electrical grounding connection to the CMPs.

According to one preferred construction sequence for the start of the foundation, the inner and outer CMPs 112, 114 are placed into an excavation 116 after which the upper ends of the two CMPs are bolted together with the upper set of spacing members 151. The CMPs 112, 114 are then lifted from the excavation 116 and the lower ends of the two CMPs are bolted to one another with the lower set of spacing members 149. The two CMPs, now bolted at their upper and lower ends by the upper and lower reinforcement and spacing members 151, 149, respectively, are then lowered back into the excavation centered and plumb. The annular space 227 between the outer CMP and the perimeter of the excavation 116 is then filled, preferably with a slurry of aggregate and cementitious material forming concrete, preferably to about four feet below pad grade, i.e., below the top of the excavation, and a concrete plug 80 is poured at the bottom of the inner CMP 112. If desired, a concrete plug 82 may be poured between the inner and outer CMPs to provide additional bolt cage support but this is optional. The inner CMP 112 is then backfilled to about five feet from the top of the foundation with uncompacted soil 229. As used herein in connection with the depth of backfilled soil and poured concrete, "about" is intended to refer to the stated value and variances of plus or minus 20% to 25%. Therefore, a soil backfill of "about five feet" is intended to refer to a soil backfill depth of between approximately 4-6 feet.

Figure 3:
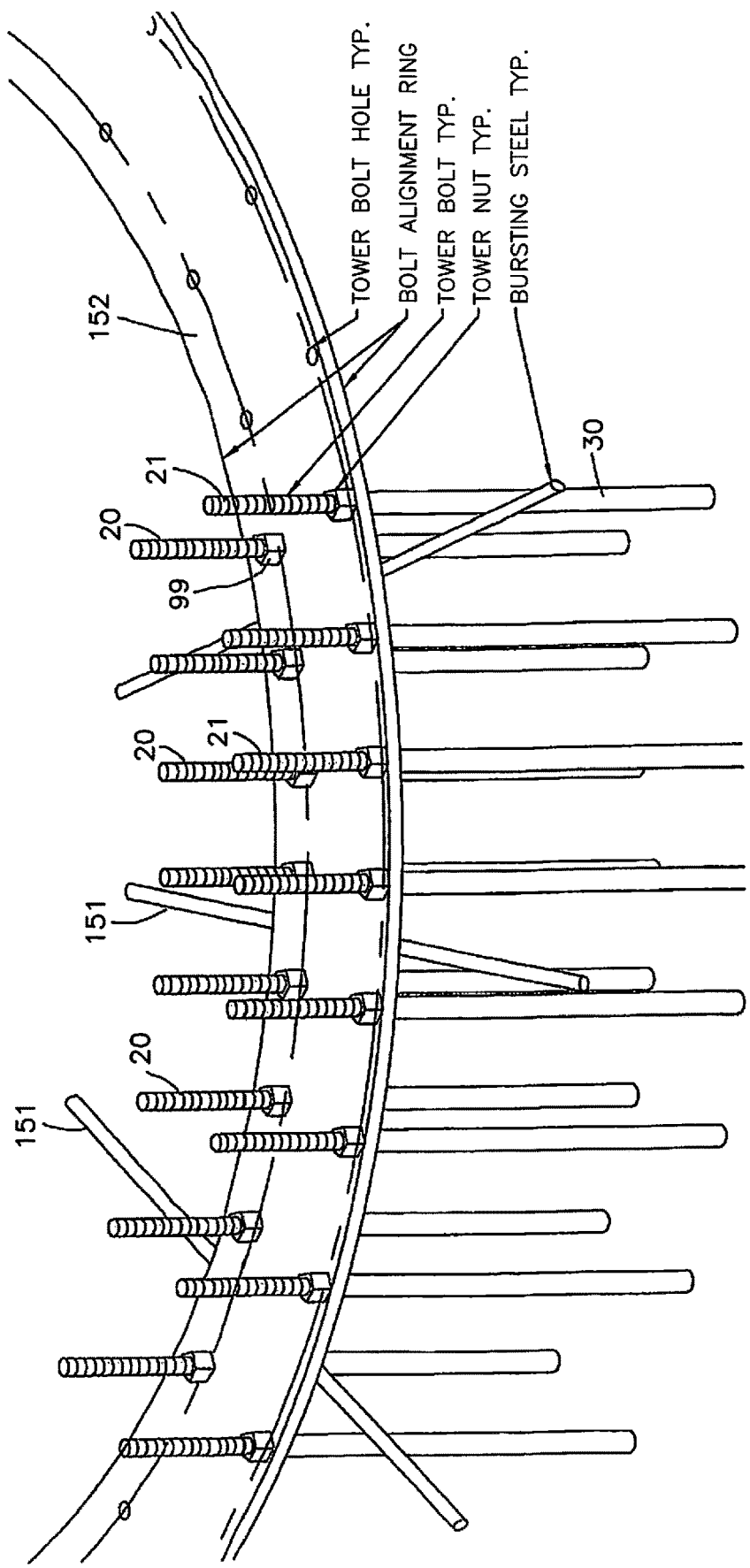
FIG. 3 is a partial perspective view of a bolt alignment ring loaded with tower anchor bolts and supported on the upper lateral reinforcement and spacing members.
Figure 3A:
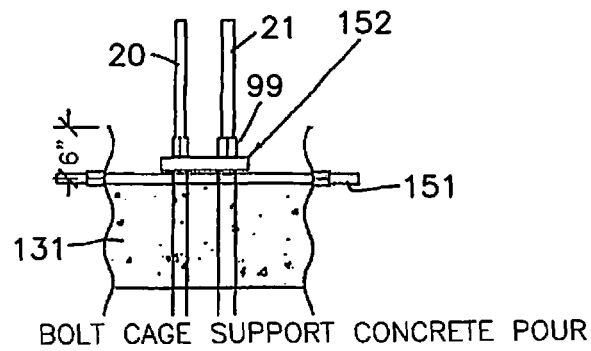
FIG. 3A is a partial cross-sectional view of a pair of tower anchor bolts secured to a bolt alignment ring like that shown in FIG. 3 and supported on the upper lateral reinforcement and spacing members for concrete pour during foundation construction in accordance with the present invention.
Figure 4:
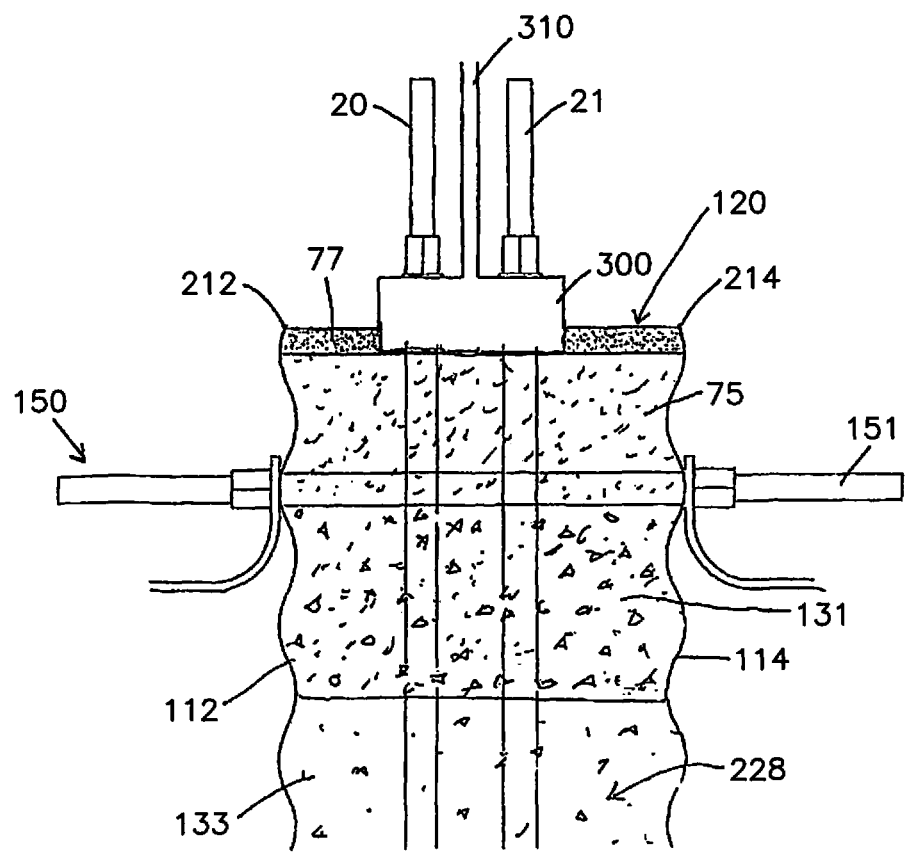
FIG. 4 is a partial cross-sectional view of a pair of tower anchor bolts as secured within concrete in the annular space between the inner and outer CMPs with both CMPs extending to the top of the foundation, the annular space having been both pre-grouted and post-grouted to the top of the foundation.

With the inner and outer CMPs secured to one another and positioned in the excavation as just described, the construction sequence continues by using the upper set of spacing members 151 to support the bolt alignment ring 152 (see FIGS. 3 and 3A). The bolt alignment ring 152 is placed within the annular space 228 between the inner and outer CMPs and on top of the upper lateral reinforcement and spacing members 151, as shown in FIGS. 3 and 3A. The upper ends of the tower anchor bolts 20, 21 are secured within holes 121 in the bolt alignment ring 152 to create the spacing for coupling of the bolt lower ends to the embedment ring to complete the tower anchor bolt cage 218. More particularly, each bolt encased within a sleeve 30, such as PVC tubing, is lowered into the excavation 116 and held in position thereon with a half nut 217 threaded above the bottom of the bolt. The bolt is lifted to insert the upper end thereof through a designated bolt hole in the bolt alignment ring and secured in position, with the top of the PVC tubing sleeve 30 against the bottom of the bolt alignment ring, by a nut 99 atop the ring as shown in FIG. 3.

Once all the tower anchor bolts 20, 21 have been nutted atop the bolt alignment ring 152, the bolt alignment ring and the attached bolts are lifted from between the CMPs. The embedment ring is then secured flush and level to the bottom of the half nut 217 and secured in place by a full nut 117 that is snugged against the underneath side of the embedment ring 122 on each bolt to complete the bolt cage 218 (see FIG. 2).

Figure 5A:
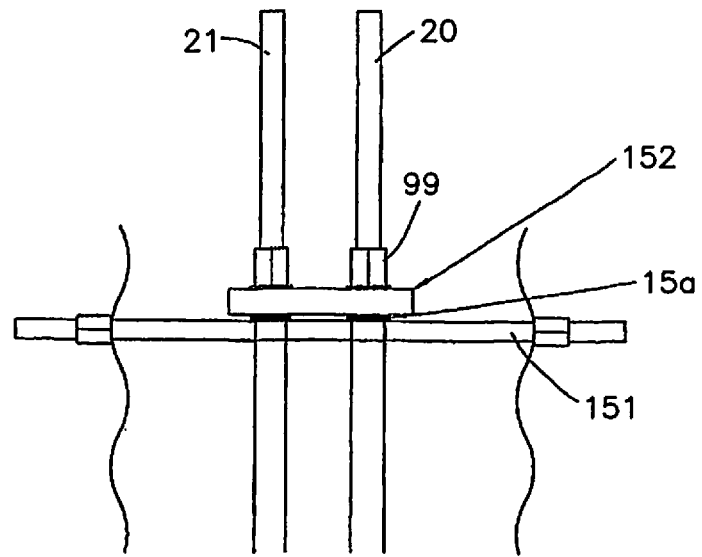
FIG. 5A is an enlarged view of Detail A of FIG. 5 showing the shims inserted between the upper lateral reinforcement and spacing members and the bolt alignment ring.

Once the embedment ring 122 is secured to the lower ends of the tower anchor bolts to form the tower anchor bolt cage 218, the upper spacing members 151 are removed to allow the cage to be lowered into the excavation and then reinstalled (see FIG. 5), with the bolt alignment ring 152 resting on the upper spacing members and supporting the upper end of the bolt cage 218. Further support of the bolt cage may be provided by the lower ends of the anchor bolts 20, 21 resting on the top of the concrete plug 82 between the inner and outer CMPs if such plug was poured (see FIG. 2). The upper lateral reinforcement members 151 are re-bolted to the CMPs with the bolt alignment ring suspended on the lateral members 151 to assist in leveling the bolt alignment ring and to provide support for the bolt cage during concrete pour in the annular space as shown in FIG. 3A. If, prior to concrete pour, the bolt alignment ring is not level, the upper lateral spacing members can be shimmed with a bolt shim 15*a* (see FIGS. 2 and 5A), such as a half circle of hose or PVC pipe. More particularly, the bolt alignment ring 152 is removed and bolt shims 15*a* are placed over the lateral spacing members 151 on the side that is low and the ring is re-installed (see FIGS. 5 and 5A). The shims 15*a* raise the low side to level the bolt alignment ring 152 as suspended from the lateral members and plumb the bolt cage 218 in one step. Grounding wires 19 and necessary electrical conduits 29 are also installed before concrete pour. After concrete pour has pre-set, the bolt alignment ring 152 can be removed and thereafter reused on another foundation.

The concrete in the annular space 228 between the CMPs spreads the tower base load across the pier. According to the present invention, lower strength concrete is poured into the annular space to within 1 ft. of the upper lateral spacer members or bolts 151. The upper layer of concrete 131 in the annular space is then poured with greater compressive strength concrete (approximately 150% greater) than the recommended foundation concrete (see FIGS. 3A and 4). By adding this additional compressive strength in the upper layer of the concrete, the remainder of the pier concrete is subjected to a lesser compressive load making it possible to reduce the cement content of the concrete 133 poured below the top foot by at least one sack per cubic yard of concrete.

After the concrete is poured, including the top layer 131 with higher strength concrete, the annular space 228 is then pre-grouted at 75 (see FIG. 4) followed by placement of the tower and post-tensioning of the tower anchor bolts 20, 21. The top of the foundation is then completed by post grouting 77 to the upper edge(s) of the CMPs as shown in FIG. 4.

Figure 5:
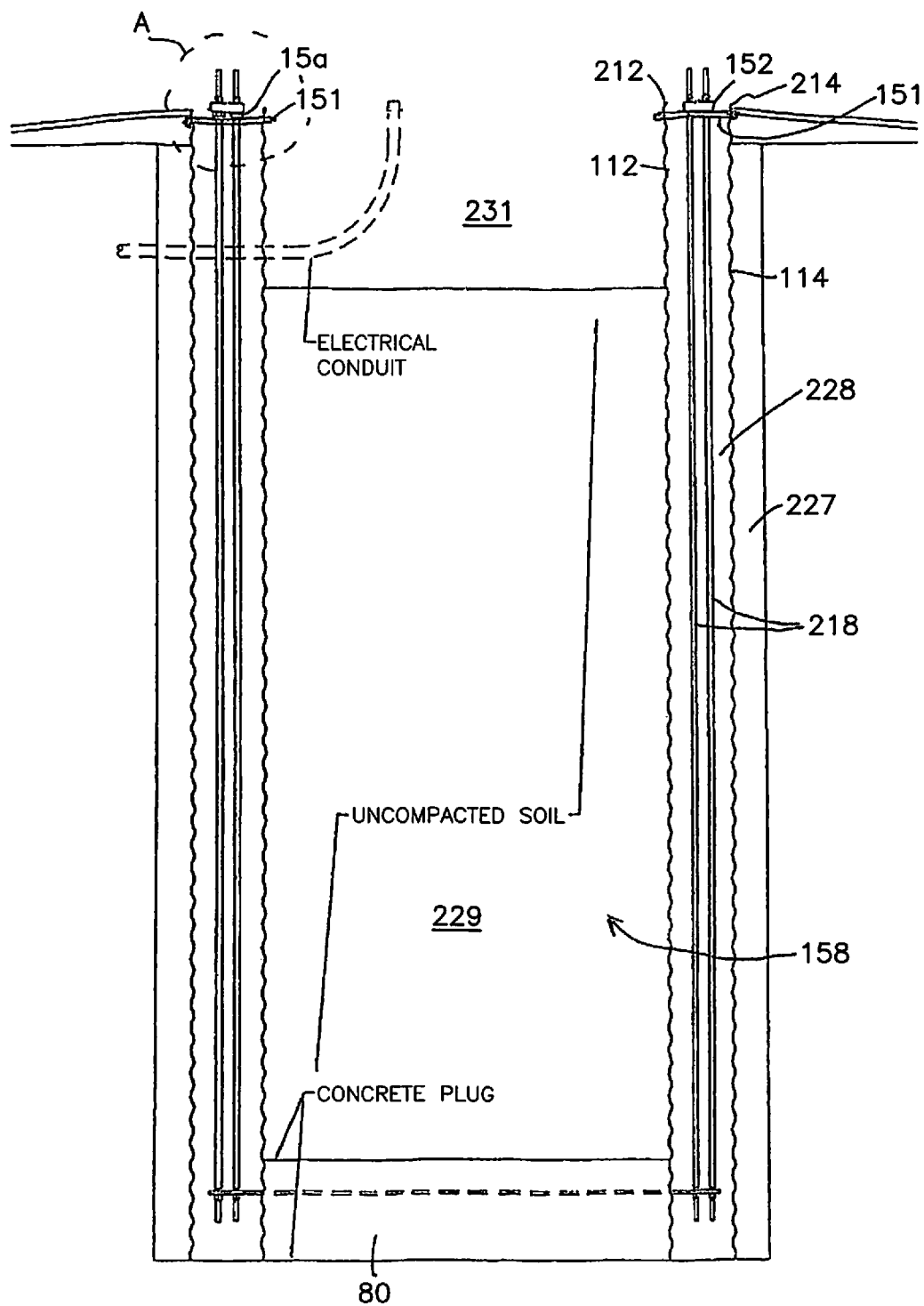
FIG. 5 is cross-sectional view of a tensionless concrete pier foundation under construction according to the present invention, the lower ends of the tower anchor bolts having been secured to the embedment ring to complete the tower anchor bolt cage and the bolt cage having been lowered into the annular space between the CMPs by the bolt alignment ring which is supported on the upper lateral reinforcement and spacing members and shimmed on one side to level the bolt alignment ring.

The central region surrounded by the inner CMP and generally designated by reference numeral 158 (see FIG. 5) is preferably filled with a soil backfill and covered with a floor. Alternatively, the central region 158 may be filled with concrete but this is more expensive. As shown in FIG. 5, when filling the central region 158 with a soil backfill according to the present invention, the lower part 229 of the region 158 is filled with uncompacted soil as already noted in connection with placement of the CMPs. Following concrete pour in the annular space, the upper part 231 of the region that is filled with soil backfill, on the order of about the upper 5 ft. of the backfill, is preferably wetted to the soil's optimum moisture content (plus or minus 2%) and compacted to improve thermal conductivity and electrical conduction heat dissipation. The upper part 233 of the outer annular space 227 between the outer CMP 114 and the perimeter of the excavation 116 is also filled with moisturized and compacted soil as in the upper part 231.

Figure 5B:
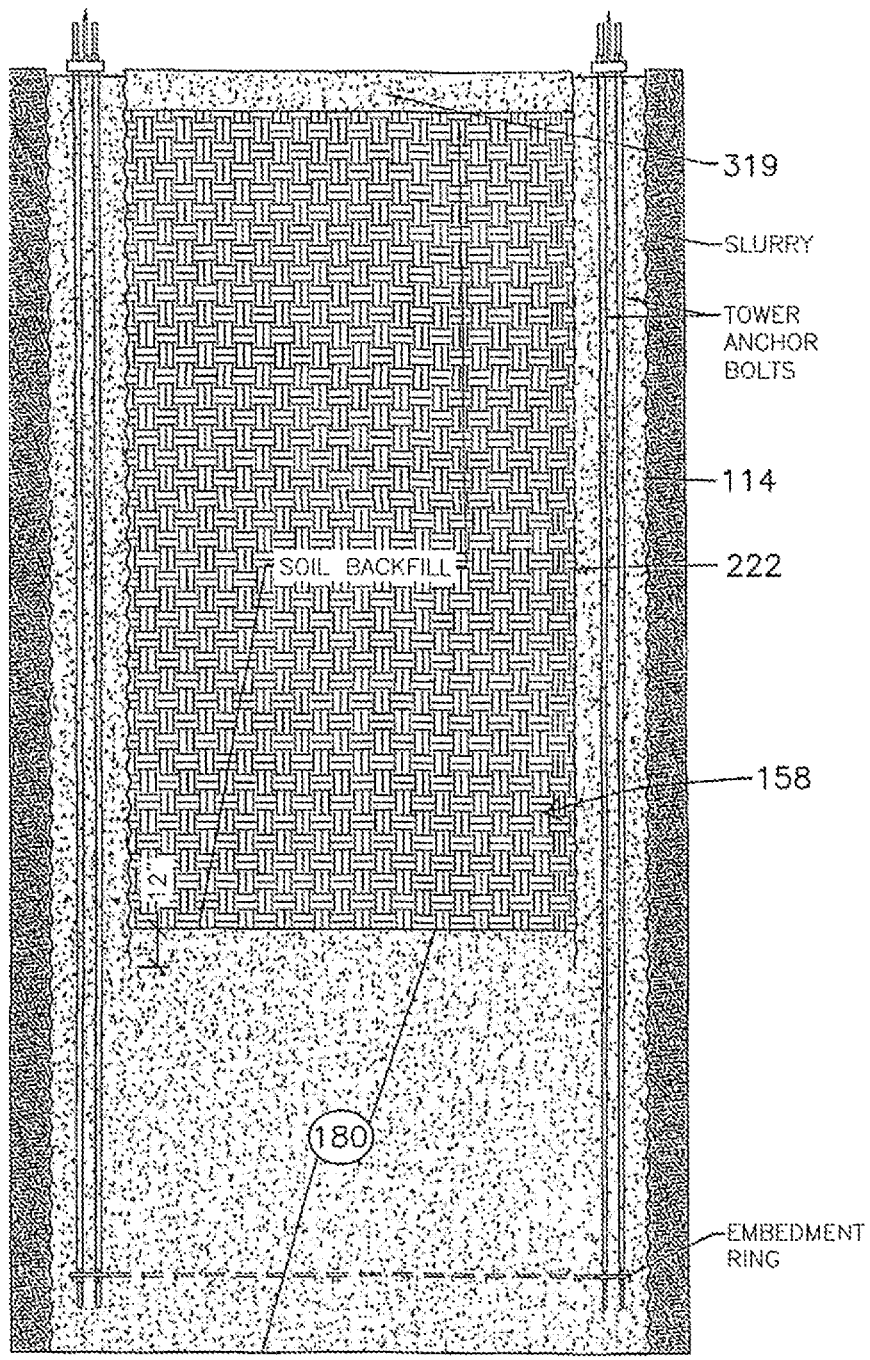
FIG. 5B is cross-sectional view of a completed tensionless concrete pier foundation like that being constructed in FIG. 5 in which a lower third of the foundation has been filled with concrete for enhanced lateral shear resistance.

As a modification of the construction shown in FIG. 5, an area generally corresponding with the bottom third of the central region 158 may be filled with concrete to form a concrete base 180 as shown in FIG. 5B. The concrete base 180 provides lateral shear resistance to the foundation and also allows the height of the inner CMP 222 to be reduced by about one third as compared with the inner CMP 112 shown in FIG. 5. The concrete base 180 also reduces the amount of soil backfill that is required, again by about one-third that of the foundation shown in FIG. 5.

Figure 6:
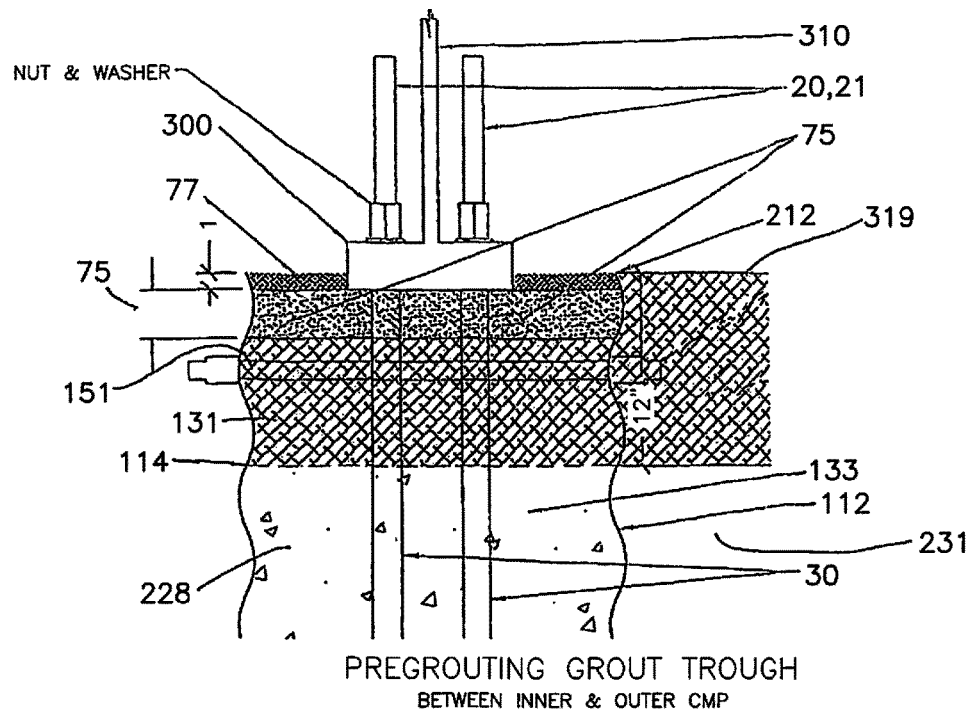
FIG. 6 shows a pair of tower anchor bolts as secured within concrete in the annular space between the inner and outer CMPs with both CMPs extending to the top of the foundation, the annular space having been both pre-grouted and post-grouted to the top of the foundation, with the floor of the foundation being formed of concrete.
Figure 7:
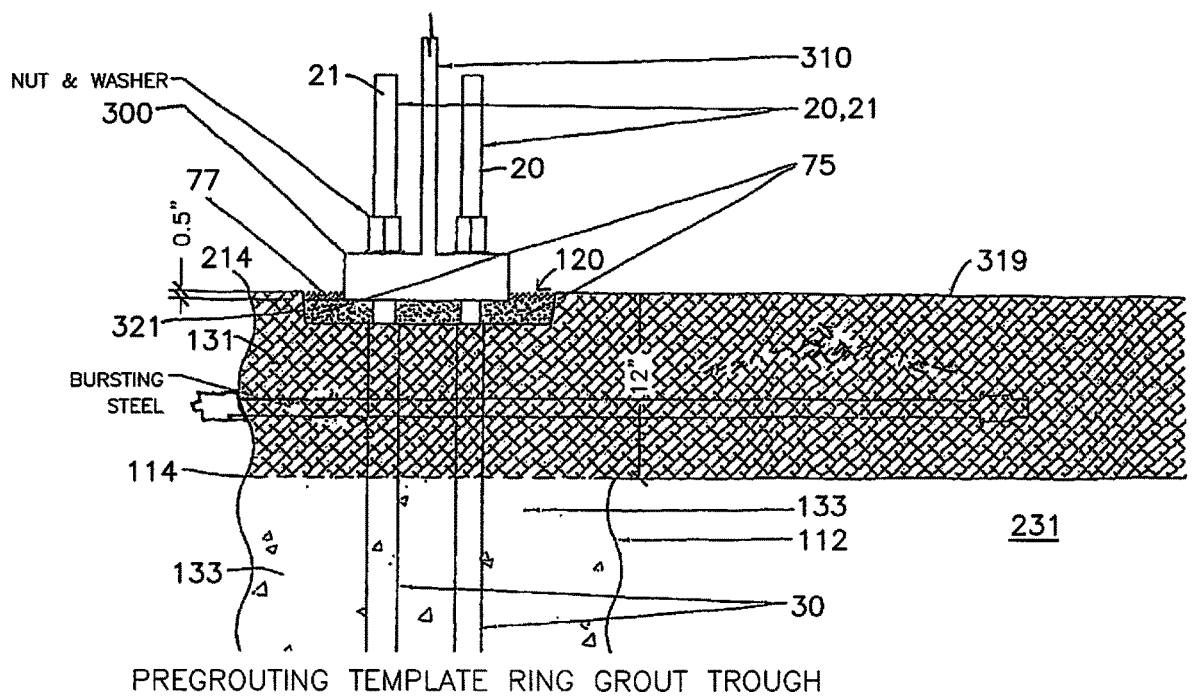
FIG. 7 shows a pair of tower anchor bolts as secured within concrete in the annular space between the inner and outer CMPs with only the outer CMP extending to the top of the foundation according to a second embodiment of the present invention, the floor of the foundation being formed of concrete and poured simultaneously with the upper one foot of concrete of the foundation, a grout trough having been formed by the chamfered sides of the bolt alignment ring, the grout trough having been both pre-grouted and post-grouted to the top of the foundation.
Figure 8:
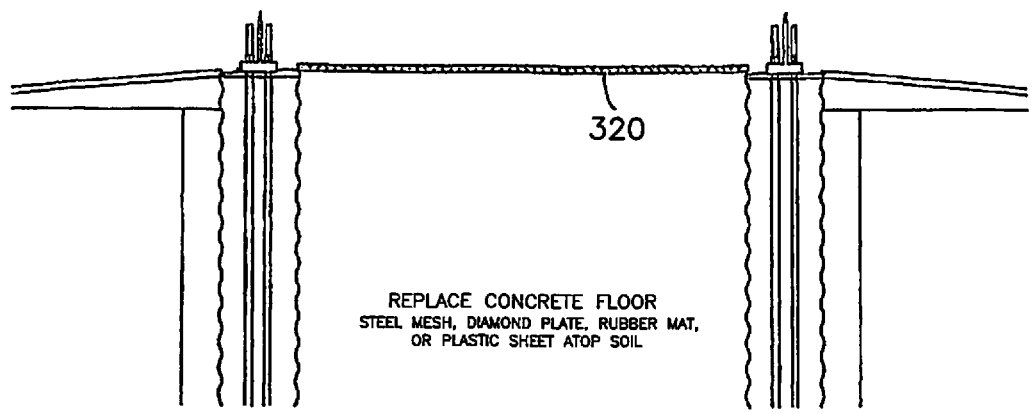
FIG. 8 is a cross-sectional view of a concrete pier foundation in which the floor is made of steel mesh, diamond plate, rubber mat, plastic sheet and the like, atop a soil backfill, in accordance with the present invention.

Traditionally, a concrete floor 319 is formed on top of the soil backfill in the center of the foundation as shown in FIGS. 5B, 6 and 7. In a preferred embodiment of the present invention shown in FIGS. 2 and 8, the floor 320 is made with steel mesh, rubber mat, diamond plate, plastic sheet and the like instead of concrete. Using these alternate materials serves to expedite construction and reduce both material and labor costs.

Figure 9:
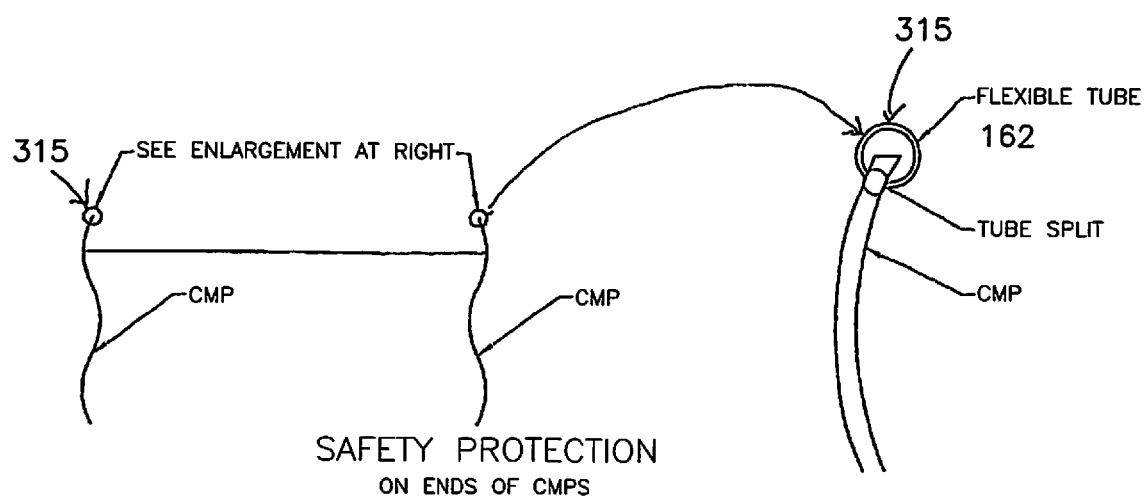
FIG. 9 shows a safety protection element for the upper edges of the CMPs in accordance with the present invention.

To protect workers from possible injury arising from contact with the upper edges 212, 214 of the CMPs, the present invention further includes a safety protection element generally designated by reference numeral 315, such as a guard or padded member 162, placed over the upper edges of the CMPs as shown in FIG. 9. The guard or padded member 162 may be a flexible tubing material, such as a split garden hose, that can be readily fitted over the exposed CMP upper edges 212, 214. The safety protection elements are preferably installed on the upper edges of the CMPs early in construction of the foundation and, most preferably, prior to the CMPs being lowered into the excavation.

A second embodiment of the present invention is shown in FIG. 7. Most of the structural features already described in connection with the first embodiment may be utilized in like manner within the second embodiment, including pre-grouting, lateral steel reinforcement and spacing members, reusable bolt alignment ring, soil backfill of the center region with about the top five feet being moistened and compacted, higher compressive strength concrete in about the top one foot of the foundation, CMP upper edge safety elements, and post-grouting. However, according to the second embodiment, the floor 319 is poured with concrete and only the outer CMP 114 extends upwardly so that the upper edge 214 thereof is flush with the upper surface 120 of the concrete forming the concrete floor. In this embodiment, the upper edge of the inner CMP is generally about one foot lower than the outer CMP upper edge 214. As shown in FIG. 7, the concrete floor is also poured with the higher compressive strength concrete.

Because the inner CMP 112 in the second embodiment has a reduced height, the grout trough 321 used for pre-grouting 75 is formed by the chamfered sides of the bolt alignment ring. In particular, during concrete pour in the annular space between the CMPs, the concrete is brought up to top of the bolt alignment ring to form the floor. Upon removal of the bolt alignment ring, the chamfered sides thereof will have created a grout trough 321 that can be pre-grouted 75 in like manner to the pre-grouting of the annular space 228 as described in connection with the first embodiment. The space between the pre-grouting 75 and the tower base flange 300 is thereafter post-grouted 77 as in the first embodiment, with the upper edge 214 of the outer CMP 114 being flush with the top of the foundation 120 with the tower in place. Further, the upper edge 214 of the outer CMP is preferably covered with a safety protection element 315.

A preferred sequence of the method steps for construction of a tensionless concrete pier foundation in accordance with the present invention may be summarized as follows:

1. Drill or dig excavation and then place outer CMP 114 into excavation with safety protection 315 having been placed to cover the upper edge of the CMP.
2. Backfill annular space between outer CMP and inner edge of excavation with slurry.
3. Place inner CMP 112 into excavation with safety protection 315 having been placed to cover the upper edge of the CMP.
4. Bolt tops of CMPs with upper lateral reinforcement and spacing members, also known as upper lateral spacer bolts 151.
5. Lift CMPs 112, 114 from excavation and add lower lateral reinforcement and spacing members 149.
6. Lower CMPs secured with spacing members 149, 151 into excavation, centered and plumb.
7. Slurry annular space 227 between excavation perimeter and outer CMP 114 to about four feet below pad grade.
8. Pour concrete plug 80 at bottom of the inner CMP 112. The concrete plug depth can be increased to provide shear resistance, including formation of a concrete base at the bottom on the order of one third the height of the inner region 158.
9. Pour concrete plug 82 between inner and outer CMPs if desired to provide optional bolt cage support prior to concrete pour.
10. Backfill lower part 229 of region 158 inside inner CMP 112 to about five feet from the top of the foundation with uncompacted soil.
11. Set bolt alignment ring 152 atop the upper lateral spacer bolts 151.
12. Secure upper ends of tower anchor bolts 20, 21 to the bolt alignment ring 152 by lowering the tower anchor bolts with sleeves thereon into the excavation, the sleeves—such as PVC tubes—being held in position by half nuts threaded above the lower ends of the tower anchor bolts; lift each tower anchor bolt and insert the upper end thereof through the designated bolt hole in the bolt alignment ring 152; and secure the tower anchor bolt in position with the top of the PVC tube against the underside of the bolt alignment ring and a nut atop the bolt alignment ring.
13. Lift the bolt alignment ring with the tower anchor bolts nutted atop from between the CMPs and install the embedment ring 122 flush and level to the bottom of the half nut and secure in place by a nut snugged against the underside of the embedment ring on each bolt to complete the tower anchor bolt cage 218.
14. Remove the upper lateral spacer bolts 151 to allow the embedment ring to pass and be lowered into the excavation adjacent the lower lateral spacer bolts 149.
15. Replace the upper lateral spacer bolts 151, nutted and secured to the CMPs, to provide support for the bolt alignment ring and anchor bolt cage; if the bolt alignment ring is not level, shim the lateral spacer bolts 151, such as with a half circle of hose or PVC, to level the bolt alignment ring 152 supported thereon and plumb the tower anchor bolt cage 218.
15a. Alternatively to use of the upper lateral spacer bolts 151 to support the tower anchor bolt cage 218, support the tower anchor bolt cage on concrete plug 82 poured at the base of the annular area 228 between the CMPs.
16. Flame cut holes through the upper ends of the CMPs to install electrical and communication conduits and install conduits.
17. Pour lower strength concrete in the annular space between the CMPs to 1 ft. of the upper lateral spacer bolts 151.
18. Pour about one foot of high strength concrete between the CMPs (and on top of the lower strength concrete) up to the bottom of the upper lateral spacer bolts or to within about six inches of the upper edges of the CMPs.
19. Alternatively to the pour described in step 18, pour about one foot of high strength concrete at the top of the annular space, or to the top of the bolt alignment ring if the sides of the bolt alignment ring are chamfered (tapered or beveled) to create a grout trough when the ring is removed.
20. Backfill upper soils inside and outside the CMPs with soil moisturized and compacted as required, preferably about the top five feet of backfill.
21. Pour level pre-grouting to desired height below top of the CMPs or, if a chamfered bolt alignment ring is used, pour pre-grouting to fill the grout trough with level grout to about half inch below the top of the bolt alignment ring.
22. Pour concrete floor with high strength concrete or, alternatively, install a floor of diamond plate, rubber mat, plastic sheet or similar material on top of the soil backfill.
23. After concrete cure, install tower base flange over tops of the tower anchor bolts and post-tension tower anchor bolts to tension the concrete pier foundation and secure the tower base flange thereto.
24. Post-grout to the top of the CMPs.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A tensionless concrete foundation for supporting a tower, the tensionless concrete foundation comprising:
a concrete pier in an excavation, the concrete pier including an outer corrugated metal pipe (CMP) and an inner CMP having a smaller diameter than the outer CMP to define an annular space between the inner CMP and the outer CMP, the outer CMP having an upper edge and the inner CMP having an upper edge lower than the upper edge of the outer CMP, the annular space being filled with concrete, the outer CMP being filled with concrete above the annular space up to the upper edge of the outer CMP to form a concrete floor having an upper surface, and the outer CMP being positioned at a bottom of the excavation;
an upper set of lateral reinforcing and spacing bolts providing bursting steel resistance separately nutted adjacent outside the outer CMP and extending horizontally across the concrete floor above the inner CMP; and
a plurality of sleeved anchor bolts each having a lower end and an upper end, the plurality of sleeved anchor bolts being embedded in the concrete floor and the concrete in the annular space, the lower end of each sleeved anchor bolt being secured to an embedment ring adjacent a bottom end of the concrete pier, the upper ends of the plurality of sleeved anchor bolts extending upwardly to above a top of the tensionless concrete foundation, the top of the tensionless concrete foundation being defined as the upper surface of the concrete floor when fully grouted to be level with the upper edge of the outer CMP, the upper edge of the outer CMP thereby being flush with the top of the tensionless concrete foundation.

2. The tensionless concrete foundation of claim 1, wherein the upper edge of the inner CMP is about one foot lower than the upper edge of the outer CMP.

3. The tensionless concrete foundation of claim 1, further comprising a lower set of lateral spacer bolts separately nutted adjacent both inside the inner CMP and outside the outer CMP, respectively, and extending horizontally across the annular space.

4. The tensionless concrete foundation of claim 1, further comprising a safety protection element covering the upper edge of the outer CMP.

5. The tensionless concrete foundation of claim 1, wherein the concrete forming the concrete floor has a higher compressive strength than the concrete filling the annular space.

\* \* \* \* \*